United States Patent
Yoshikawa

(10) Patent No.: US 7,265,073 B2
(45) Date of Patent: Sep. 4, 2007

(54) EXHAUST GAS PURIFYING CATALYST AND PROCESS FOR PURIFYING EXHAUST GAS

(75) Inventor: Tatsuya Yoshikawa, Himeji (JP)

(73) Assignees: ICT Co., Ltd., Osaka (JP); International Catalyst Technology, Inc., Auburn Hills, MI (US)

( * ) Notice: Subject to any disclaimer, the term of this patent is extended or adjusted under 35 U.S.C. 154(b) by 374 days.

(21) Appl. No.: 10/824,847

(22) Filed: Apr. 15, 2004

(65) Prior Publication Data

US 2004/0209761 A1 Oct. 21, 2004

(30) Foreign Application Priority Data

Apr. 17, 2003 (JP) .............................. 2003-112993

(51) Int. Cl.
*B01J 29/068* (2006.01)
*B01J 29/22* (2006.01)
*B01J 29/44* (2006.01)
*B01J 29/67* (2006.01)
*B01J 29/12* (2006.01)

(52) U.S. Cl. ............................ 502/66; 502/60; 502/63; 502/64; 502/65; 502/67; 502/69; 502/71; 502/73; 502/74; 502/78; 502/79; 502/77; 502/527.15

(58) Field of Classification Search ................. 502/60, 502/63, 64, 65, 66, 67, 69, 73, 71, 74, 78, 502/79, 77, 527.15

See application file for complete search history.

(56) References Cited

U.S. PATENT DOCUMENTS

| 4,985,210 A | 1/1991 | Minami ...................... 422/169 |
| 5,407,880 A | 4/1995 | Ikeda et al. ................... 502/67 |
| 6,107,239 A * | 8/2000 | Qin et al. .................... 502/300 |
| 6,503,862 B1 * | 1/2003 | Yamamoto .................... 502/65 |
| 6,893,997 B2 * | 5/2005 | Matsumoto et al. ......... 502/326 |

FOREIGN PATENT DOCUMENTS

| EP | 0 782 880 A1 | 7/1997 |
| EP | 1 121 981 A2 | 8/2001 |
| EP | 1 332 787 A1 | 8/2003 |
| JP | 02-056247 | 2/1990 |
| JP | 5 285 391 | 11/1993 |

* cited by examiner

*Primary Examiner*—Elizabeth D. Wood
(74) *Attorney, Agent, or Firm*—Occhiuti Rohlicek & Tsao LLP

(57) ABSTRACT

An exhaust gas purifying catalyst formed by having a first rhodium-containing catalyst layer, a second zeolite-containing catalyst layer, and a third palladium-containing catalyst layer superposed sequentially on a carrier, and a process for purifying the exhaust gas from an internal combustion engine by using the catalyst. A catalyst possessing durability and excelling in the ability to adsorb hydrocarbon, the ability to purify, and the three-way performance is provided.

13 Claims, No Drawings

EXHAUST GAS PURIFYING CATALYST AND PROCESS FOR PURIFYING EXHAUST GAS

BACKGROUND OF THE INVENTION

1. Field of the Invention

This invention relates to a catalyst for purifying exhaust gases discharged from an internal combustion engine and a process for purifying the exhaust gases using the catalyst. More specifically, this invention relates to a catalyst for efficiently purifying hydrocarbons emitted at the start of the engine and a process for purifying the exhaust gases using the catalyst.

2. Description of Related Art

Technology of after-treatment by catalysts forms core of means to reduce exhaust gases (or pollutants) from an internal combustion engine. Expectations for improving the efficiency have increasingly grown from the view of environmental conservation. The exhaust gas of gasoline engines contains hydrocarbons (hereinafter "hydrocarbon" may be referred to as "HC"), carbon monoxide (CO), and nitrogen oxide (NOx). For purifying these pollutants, so-called "three-way catalyst or TWC" which has a noble metal and refractory inorganic oxides, such as alumina and cerium oxide, is in common usage.

The TWC is activated by the heat of exhaust gases, thereby promoting the purification reaction. When the temperatures of the exhaust gas or of the catalyst body are low, purification reactions do not proceed efficiently and the pollutant gas is discharged unpurified. Particularly, the unburned HC which comes out at the ignition of the engine in a cold state, is not readily purified (in spite of a high concentration) by a conventional TWC because the temperatures of the gas and body are low. Thus, so-called "HC-adsorber catalyst" system has been proposed which the unburned HC are adsorbed in a cold state by adsorbents, and then the HC are purified by a catalyst in a temperature in which the catalyst has been activated. It has been disclosed that a HC adsorber catalyst having structure of both a oxidation-reduction ability and zeolite are layered (for example, JP-A-02-056247) and that a purification system in which a HC adsorbent brick and a conventional catalyst brick are separately allocated (for example, U.S. Pat. No. 4,985,210A).

SUMMARY OF THE INVENTION

In the conventional catalyst system utilizing the HC adsorber catalyst, there has been a problem that a purification ratio is insufficient at temperature regions during which the adsorbed HC are desorbed, thereby causing the HC to release in almost unpurified. A system using HC adsorbent (zeolite) requires, e.g., by-pass line in the system or large amount of precious metals as components.

I, as a result of a diligent study pursued with the object of solving the problem mentioned above, have found that an excellent exhaust gas purifying ability after endurance can be achieved by forming a sandwich structure in which a zeolite-containing layer is set as the center and noble metal-containing layers are set at the opposite sides thereof. The present invention has been perfected as a result.

To be specific, this invention concerns a catalyst for purifying exhaust gases, characterized by comprising a first rhodium-containing catalyst layer deposited on a carrier, a second zeolite-containing catalyst layer deposited on the first layer, and a third palladium-containing catalyst layer deposited on the second layer, and a process for purifying the exhaust gas from an internal combustion engine using the catalyst.

In accordance with the present invention, the catalyst can exhibit an excellent activity after endurance, an excellent ability to adsorb HC, an ability to purify HC, and a three-way performance. It is particularly capable of efficiently purifying such HC which occur at the time of starting a gasoline engine.

DESCRIPTION OF THE PREFERRED EMBODIMENT

This invention will be described in detail below.

The catalyst contemplated by this invention can be used, as one of the elements of the after-treatment system of an internal combustion engine, either singly or in combination with a TWC, a HC adsorber catalyst, and a NOx adsorber catalyst. When several catalysts are to be used in the system, it may exhibit the function thereof maximally. The choice of catalysts combination may be properly implemented by the prospective user of the system.

The HC adsorber catalyst of this invention, using zeolites and a catalyst manifesting so-called three-way performance are deposited in a superposed state on a carrier. At low temperature regions, it serves to adsorb HC and at high temperature regions it also works as conventional TWC.

In the catalyst of this invention, therefore, a first rhodium-containing catalyst layer is formulated on a carrier, a second catalyst layer containing zeolite formulated on the first layer, and a third palladium-containing catalyst layer further formulated on the second layer. Incidentally, the palladium, when necessary, may be replaced with palladium and platinum or with platinum alone.

The carrier or support to be used in this invention may be an integral structure type monolithic carrier or pellets of a granular form. As the integral structure monolithic carrier, so-called ceramic honeycomb carrier may be generally used. Particularly, the honeycomb carriers made of materials, such as cordierite, mullite, $\alpha$-alumina, zirconia, titania, titanium phosphate, aluminum titanate, aluminosilicate, and magnesium silicate, prove favorable. Among them, that made of cordierite proves more favorable. Besides, the carriers in an integral structure made of oxidation-resisting thermostable metals, such as stainless steel and Fe—Cr—Al alloys, are also usable. As the pellet carrier, known carriers made of alumina or titania are usable. The integral structure type carriers are preferable from the viewpoint of decreasing the pressure of the exhaust gas.

The first catalyst layer contains rhodium. The rhodium is deposited as dispersed in a refractory inorganic powder such as of silicon carbide, alumina, titania, or silica. The first catalyst layer may further contain rare earth elements, such as cerium and lanthanum, zirconium and barium as oxides.

The zeolite to be used in this invention is a crystalline aluminosilicate, which manifests the HC adsorbing-desorbing property. Examples of the zeolite may include ferrierite, MFI zeolite, $\beta$-zeolite, Y zeolite, and mordenite. Among them, one or more members, in particular $\beta$-zeolite in a proportion of not less than one half of the total amount of the mixture may be preferably cited. It is preferable to use the aluminosilicate of Si/2Al=10-150 in a proportion of not less than one half and more preferable to use the composition of Si/2Al=15-120 in a proportion of not less than 70%.

The second catalyst layer contains a zeolite. The zeolite to be used is either singly or in the form of a mixture of two or more members thereof. It is preferred to use a binder in view of making the strengthened layer. The choice of binder is not particularly restricted but required to induce adhesion of zeolite to the layer. Examples of the binder may include silica sol and alumina sol. The amount of the binder to be used is not particularly restricted but for instance may be in the range of 3-30 g, per 100 g of the zeolite.

The third catalyst layer contains palladium. The palladium is deposited as dispersed in the refractory inorganic powder such as Sic, alumina, titania and silica. The third catalyst layer may further contain rare earth elements, such as cerium and lanthanum, zirconium and barium as oxides.

According to this structure of the catalyst, the adsorption and desorption of HC are inferred as follows. (a) At low temperature regions, HC is efficiently adsorbed to the zeolite, which locate in the intermediate layer, while the catalyst remains inactive for purification, (b) the adsorbed HC begin to desorb from the zeolite layer with the rise of the temperature of the catalyst, (c) the desorbed HC is adsorbed to the palladium in the over-layer and suppress the desorption, (d) the palladium containing layer is activated and enabled to purify the desorbed HC, and (e) the lower layer containing rhodium contributes to the conversion of the HC in consequence of the further rise of the temperature, are allowed to proceed smoothly. The expression "efficient adsorption" used in step (a) indicates that the diffusion speed of a gas in the layer is fast and its efficiency of adsorption is high. The determination of gas diffusion is difficult because the effect of gas diffusion depends on the number of cells (cell density) in the carrier and the physical properties of the materials used for catalyst coating. In accordance with the structure of the present catalyst, sufficient dispersion speed, i.e. efficient adsorption, can be obtained for a carrier conventionally used. Owing to the structural characteristics of the present catalyst, desorption of the adsorbed HC at step (b) is also suppressed. In general, the purification efficiency of the adsorbed HC can be advantageously raised by suppressing desorption at low temperatures. Since the present catalyst contains the zeolite at the intermediate layer, the zeolite does not contact the gas flow directly, and the temperature rise of the zeolite layer becomes slower than that of the surface layer, thereby desorption is suppressed. Further, part of the desorbed HC is adsorbed again by the upper palladium layer to suppress desorption (c). Since the palladium layer, which is situated closer to the surface layer than the zeolite layer, contacts the gas flow directly and, therefore, arrives fast at the activated state to purify the desorbed HC efficiently (d) Though the adsorbed HC is continuously desorbed even after the catalyst has been activated, the lower rhodium layer functions to effectively perform purification at high temperatures (exceeding 300° C.). Further, the rhodium in the lower layer is not easily exposed to poisoning substances, such as oxygen, and improved in durability.

Any of the coating processes known to the art may be adopted. The first catalyst layer is produced, for example, by dispersing an aqueous salt of rhodium, if necessary together with oxides of cerium or barium, in alumina to deposit. The rhodium-containing powder thus obtained is milled by wet pulverization using a ball mill to form a slurry of them. The slurry is applied to a honeycomb carrier, and excess slurry is brown off. The drying is performed at a temperature of 80° C.-250° C. and preferably 100° C.-150° C. Optionally, it is calcined at a temperature of 300° C.-800° C., preferably 400° C.-600° C. for a period of 0.5-3 hours, preferably 1-2 hours. The slurry is applied to the carrier in several steps to obtain a prescribed loading, if not obtained once. The second catalyst layer is produced, for example, by milling the zeolite and optionally silica sol as the binder to form a slurry of them. The subsequent procedure is performed in the same manner as described above. The third catalyst layer is produced, for example, by repeating the procedure of the first catalyst layer, except that palladium is used instead of rhodium.

The catalyst of the present invention can manifest the equivalent performance as TWC at high temperatures, for example, exceeding 300° C.

The catalyst of this invention is simple in structure of the coat and suitable for production, and together allows a saving on the amount of the catalyst component as compared with the conventional catalyst, and depresses back pressure.

In the catalyst structure of the present invention, when the sequence of the layers is varied, the produced catalyst manifests no longer the same catalytic performance. In order to achieve the same catalytic performance, excess amount of the adsorbent and the noble metal are required. This addition is not economical.

The present catalyst may optionally have a fourth catalyst layer thereon. By superposing a layer containing rhodium and/or platinum, it is possible to improve the three-way property or prevent the third layer from being poisoned. The fourth catalyst layer generally contains 0.1-1.5 g of platinum and 0.05-0.5 g of rhodium. When the position of the third catalyst layer is exchanged with the fourth catalyst layer, the catalytic activity of the invention would not be lost.

The catalyst of this invention is applied as part of the system for after-treating the exhaust gas of an engine. The catalyst composition depends extensively on the structure of the system for after-treatment such as the atmosphere (oxygen concentration) in the exhaust gas, the heating-up speed of the temperature at the position at which the catalyst is mounted, the calorific capacity of the catalyst body, the amount of the unburned HC to be discharged, and the species of the unburned HC. It is, therefore, difficult to define uniquely the ratio of the catalyst components. Preferably, the amount of the first rhodium-containing catalyst layer may be in the range of 10-120 g, the second catalyst layer containing zeolite in the range of 60-300 g, and the third catalyst containing palladium in the range of 20-100 g, and the total amount of the coat may be in the range of 90-520 g respectively by weight per one-liter of the catalyst. As regards the amounts of noble metals to be used, the amount of rhodium may be in the range of 0.05-5 g and that of palladium in the range of 1-10 g and the amount of platinum optionally used may be in the range of 0.2-5 g, that of cerium in the range of 3-80 g as reduced to cerium oxide, and that of barium in the range of 1-20 g as reduced to barium oxide respectively by weight per 1 liter of the catalyst.

More preferably, the amount of the first catalyst layer is in the range of 30-100 g, the second layer in the range of 100-250 g, and the third layer in the range of 30-80 g, the total amount of the coat is in the range of 160-430 g respectively by weight pet 1 liter of the catalyst. As regards the amounts of noble metals to be used, more preferably the amount of rhodium is in the range of 0.2-3 g and that of palladium in the range of 2-7 g and the amount of platinum optionally used is in the range of 0.5-4 g, that of cerium in the range of 10-70 g as reduced to cerium oxide, and that of barium in the range of 3-15 g as reduced to barium oxide respectively by weight per 1 liter of the catalyst.

By using the exhaust gas purifying catalyst of this invention, it is possible to attain efficient purification of the exhaust gas from an internal combustion engine such as an automobile using gasoline.

EXAMPLES

Now, this invention will be described more specifically with reference to examples below. It should be noted, however, that this invention is not restricted by these examples.

Example 1

A rhodium-deposited alumina powder (A) was obtained by impregnating 200 g of alumina (surface area: 150 m$^2$/g) with an aqueous rhodium nitrate solution containing 3 g of rhodium, drying the impregnated alumina overnight at 120° C., and then calcining the dried alumina at 450° C. for one hour. The powder (A) thus obtained, 200 g of a cerium-zirconium-lanthanum composite oxide (B) (surface area: 60 m$^2$/g), 200 g of zirconium oxide (C) (surface area: 50 m$^2$/g), and 20 g of barium acetate (D) as reduced to barium oxide were added together in 800 ml of an aqueous acetic acid solution and then milled to form a slurry (E). A monolithic carrier (made of cordierite, 400 cells, 4 mils, 1 L) was coated with the slurry (E), dried at 120° C., and then calcined at 450° C. for one hour. The amount of the catalyst composition applied to the carrier was 62.3 g/L and that of rhodium was 0.3 g/L.

ZSM5 zeolite (300 g), 1150 g of β-zeolite, 150 g of Y zeolite, and 200 g of silica sol as reduced to silica were added to 2000 g of water and then milled to form a slurry (F). The aforementioned rhodium-coated carrier was further coated with the slurry (F), dried, and calcined at 450° C. The amount of the zeolite layer thus used for coating was estimated to be 180 g/L.

Three hundred (300) g of alumina (surface area: 150 m$^2$/g) was impregnated with an aqueous palladium nitrate solution containing 50 g of palladium, dried overnight at 120° C., and then calcined at 450° C. for one hour to obtain a palladium-deposited alumina powder (G). Powder (G), 200 g of cerium-zirconium-lanthanum composite oxide (H) (surface area: 90 m$^2$/g), 100 g of zirconium oxide (C) (surface area: 50 m$^2$/g), and 30 g of barium acetate (D) as reduced to barium oxide were added to 800 ml of an aqueous acetic acid solution and then milled to form a slurry (I). The carrier coated with the rhodium layer and the zeolite layer mentioned above was further coated with the slurry (I), dried, and then calcined at 450° C. for one hour. The amount of the palladium layer used for coating was estimated to be 68.3 g/L. The amount of palladium deposited was 5.0 g/L.

Comparative Example 1

A catalyst was prepared by following the procedure of Example 1 while changing the sequence of application to slurry (I), slurry (F), and slurry (E).

The amounts of the applied layers were 68.3 g/L, 180 g/L, and 62.3 g/L respectively upward from the lower layer. The amount of rhodium deposited was 0.3 g/L and that of palladium 5.0 g/L.

Comparative Example 2

A catalyst was prepared by following the procedure of Example 1 while changing the sequence of application to slurry (E), slurry (I), and slurry (F).

The amounts of the applied layers were 62.3 g/L, 68.3 g/L, and 180 g/L respectively upward from the lower layer. The amount of rhodium deposited was 0.3 g/L and that of palladium 5.0 g/L.

Comparative Example 3

A catalyst was prepared by following the procedure of Example 1 while omitting rhodium.

The amounts of the applied layers were 62.0 g/L, 180 g/L, and 68.0 g/L respectively upward from the lower layer. The amount of palladium deposited was 5.0 g/L.

Comparative Example 4

A catalyst was prepared by following the procedure of Example 1 while omitting palladium.

The amounts of the applied layers were 62.0 g/L, 180 g/L, and 63.0 g/L respectively upward from the lower layer. The amount of rhodium deposited was 0.3 g/L.

Comparative Example 5

A catalyst was prepared by following the procedure of Example 1 while changing the sequence of application to slurry (F), slurry (E), and slurry (I).

The amounts of the applied layers were 180 g/L, 68.3 g/L, and 62.3 g/L respectively upward from the lower layer. The amount of rhodium deposited was 0.3 g/L and that of palladium 5.0 g/L.

(Evaluation of Catalyst)

Preparation of Upper Stream Side Catalyst

The HC adsorber catalyst was rated for the ability to purify HC with a system using two sample catalysts. Specifically, the ordinary (not containing an adsorbent) TWC (palladium 5.0 g/L, rhodium 0.3 g/L, 600 cells, 0.5 L, total weight of coat 180 g/L) and the HC adsorber catalyst were placed in separate cases. The cases were connected in series to form a structure for passing the exhaust gas. It was a model of the system mounted on a vehicle.

Test of Catalyst for Durability

The TWC and the HC adsorber catalyst thus obtained were tested with the exhaust gas of an engine for durability.

The conditions under which the durability test was performed are shown below.

(1) Upper stream side TWC: 850° C. (inlet temperature)
   Period of durability: 50 hours
(2) HC adsorber catalyst: 700° C. (inlet temperature)
   Period of durability: 50 hours The catalysts obtained in Example 1 and Comparative examples were rated for performance with a commercially available gasoline engine (displacement: 2.4 L) (mode of evaluation: LA-4 mode). The catalysts were compared with respect to three-way performance and ability to purify HC by adsorption. The results are shown in Tables 1 and 2.

TABLE 1

| | Rating of three-way performance | | |
| --- | --- | --- | --- |
| | Degree of conversion (400° C.) (A/F = 14.6) | | |
| | HC (%) | CO (%) | NOx (%) |
| Example 1 | 97.2 | 98.2 | 97.2 |
| Com Ex 3 | 96.8 | 85.5 | 87.2 |

Conditions for rating three-way performance (the HC adsorber catalyst alone used)

Temperature for rating: 400° C. (temperature at inlet of catalyst)

Rotational frequency: 2300 rpm

Negative pressure of suction air: −300 mmHg

Volume of catalyst: 1 L
Air fuel ratio: A/F=13.1 to 15.1
Variation of air fuel ratio: A/F±1.0 (1 Hz)

TABLE 2

Performance of HC adsorber catalyst

|  | Amount of adsorption in engine test (g) | Degree of conversion of adsorbed HC (%) | Vehicle LA-4 (g/mile) | | |
|---|---|---|---|---|---|
|  |  |  | HC | CO | NOx |
| Example 1 | 0.95 | 47.5 | 0.019 | 0.74 | 0.127 |
| Com Ex 1 | 0.94 | 20.5 | 0.026 | 0.80 | 0.130 |
| Com Ex 2 | 1.05 | 22.0 | 0.027 | 0.78 | 0.133 |
| Com Ex 3 | 0.96 | 39.5 | 0.023 | 0.81 | 0.182 |
| Com Ex 4 | 0.90 | 2.0 | 0.030 | 0.90 | 0.130 |
| Com Ex 5 | 0.80 | 42.0 | 0.023 | 0.77 | 0.135 |
| Reference | — | — | 0.031 | 0.94 | 0.242 |

Reference: Manifold catalyst alone

Conditions for rating ability to purify HC by adsorption
Temperature for rating: Elevated from 50° C. to 450° C. at a rate of 150° C./min (temperature at inlet of former stage catalyst)
  Rotational frequency of engine: 2300 rpm
  Negative pressure of suction air: −300 mmHg
  Upper stream side TWC: 0.5 L
  HC adsorber catalyst: 1 L
  Temperature for HC adsorption: 50° C.
  Air fuel ratio: A/F=14.6
Structure of system: TWC (1.3 L, 900 cells, 2 mils, Pd/Rh: 1.27 g/0.36 g)+HC adsorber catalyst (positioned under floor)

The entire disclosure of Japanese Patent Application No. 2003-112993 filed on Apr. 17, 2003 including specification, claims and summary are incorporated herein by reference in its entirety.

What is claimed is:

1. A catalyst for purifying exhaust gases, comprising:
    a first layer that includes a rhodium-containing catalyst and is deposited on a carrier,
    a second layer that includes a zeolite-containing catalyst and is deposited on the first layer, and
    a third layer that includes a palladium-containing catalyst and is deposited on the second layer.

2. A catalyst according to claim 1, wherein the carrier is a monolith carrier or granular carrier.

3. A catalyst according to claim 1, wherein the rhodium is deposited as dispersed in a refractory inorganic powder.

4. A catalyst according to claim 3, wherein the refractory inorganic powder is at least one member selected from the group consisting of silicon carbide, alumina, titania, silica and mixtures thereof.

5. A catalyst according to claim 1, wherein the first catalyst layer further contains an oxide made of one member selected from the group consisting of rare earth elements, zirconium and barium.

6. A catalyst according to claim 1, wherein the zeolite is at least one member selected from the group consisting of ferrierite, MFI zeolite, .beta.-zeolite, Y zeolite, mordenite, and mixtures thereof.

7. A catalyst according to claim 1, wherein the palladium is deposited as dispersed in a refractory inorganic powder.

8. A catalyst according to claim 7, wherein the refractory inorganic powder is at least one member selected from the group consisting of silicon carbide, alumina, titania, silica and mixtures thereof.

9. A catalyst according to claim 1, wherein the third catalyst layer further contains an oxide made of one member selected from the group consisting of rare earth elements, zirconium and barium.

10. A catalyst according to claim 1, wherein the catalyst contains 10-120 g of the first catalyst layer, 60-300 g of the second catalyst layer, and 20-100 g of the third catalyst layer, per 1 liter of the catalyst.

11. A catalyst according to claim 1, wherein the catalyst contains 90-520 g of the 1-3 catalyst layers, per 1 liter of the catalyst.

12. A catalyst according to claim 1 further comprising a fourth catalyst layer containing at least one member selected from the group consisting of platinum, rhodium and mixtures thereof deposited on the third layer.

13. A catalyst system for purifying exhaust gases comprising: a catalyst set forth in claim 1, arranged at a down stream side of the gases, and a three-way catalyst arranged at an upper stream side of the gases.

* * * * *